United States Patent [19]

Garel-Jones et al.

[11] Patent Number: 5,546,180
[45] Date of Patent: Aug. 13, 1996

[54] APPARATUS FOR INSERTING LIGHT SIGNALS INTO, OR RECEIVING LIGHT SIGNALS FROM, ONE OF A SERIES OF OPTICAL PATHS AND USABLE AS OPTICAL TIME DOMAIN REFLECTOMETRY APPARATUS

[75] Inventors: Philip M. Garel-Jones, Nepean; Timothy P. Cutts, Ottawa, both of Canada

[73] Assignee: JDS Fitel Inc., Ottawa, Canada

[21] Appl. No.: 498,878

[22] Filed: Jul. 6, 1995

[51] Int. Cl.[6] ............................. G01N 21/84; G02B 6/34; G02B 26/08
[52] U.S. Cl. ..................... 356/73.1; 385/22; 385/36
[58] Field of Search ............................. 356/73.1; 385/22, 385/26, 36

[56] References Cited

U.S. PATENT DOCUMENTS 4,634,239  1/1987  Buhrer ........................... 385/22 X
4,705,349  11/1987  Reedy ................................. 385/22
4,720,162  1/1988  Mochizuki et al. ................ 385/36 X
5,453,827  9/1995  Lee ..................................... 356/73.1

FOREIGN PATENT DOCUMENTS 4-353736  12/1992  Japan ............................ 356/73.1

*Primary Examiner*—Vincent P. McGraw
*Attorney, Agent, or Firm*—Neil Teitelbaum Associates

[57] ABSTRACT

A method and apparatus is provided for injecting an optical test pulse mid-stream into an optical path to be tested by providing a switch that in normal transmitting and receiving of data includes two lenses separated by a gap. Data is usually transmitted across the gap from one lens to the other. In a test mode where OTDR is to be performed, a prism functioning in a similar manner to a periscope is moved into the gap between the lenses to couple/inject a test pulse into one of the lenses. An arrangement is described wherein either side of transmission line on either side of the gap can be tested.

13 Claims, 8 Drawing Sheets

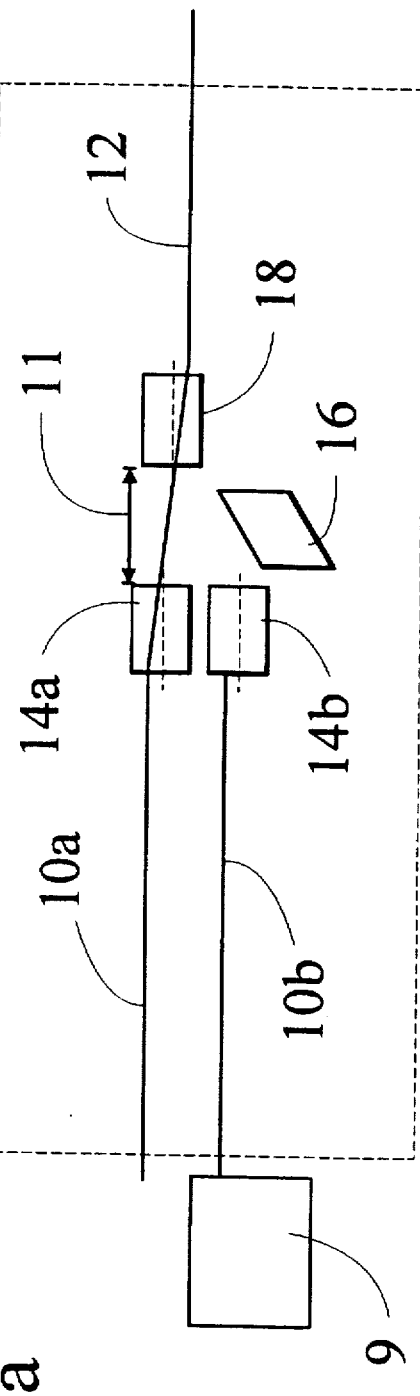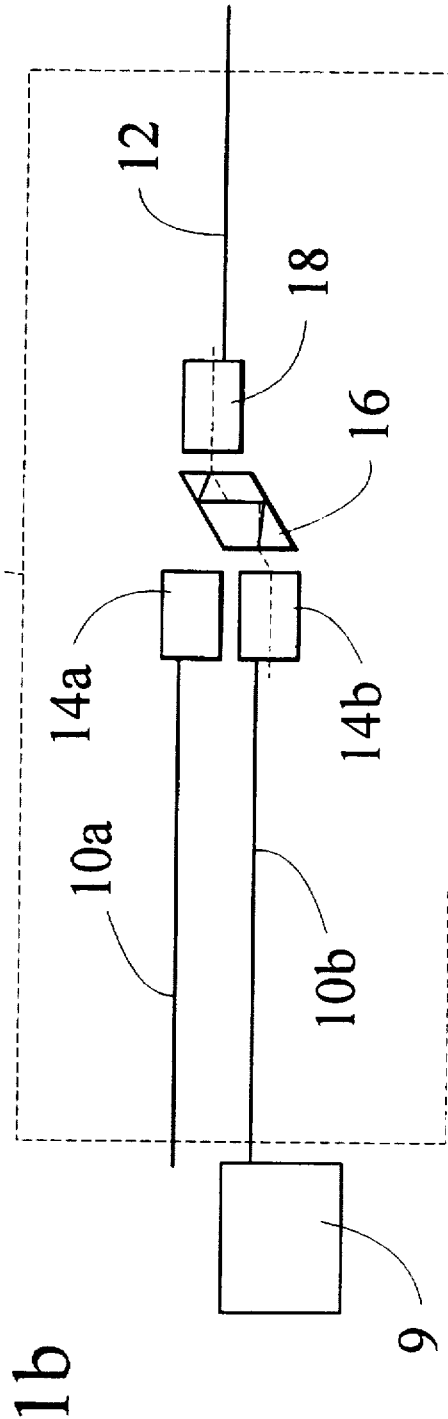

APPARATUS FOR INSERTING LIGHT SIGNALS INTO, OR RECEIVING LIGHT SIGNALS FROM, ONE OF A SERIES OF OPTICAL PATHS AND USUABLE AS OPTICAL TIME DOMAIN REFLECTOMETRY APPARATUS

FIELD OF THE INVENTION

This invention relates to optical test apparatus, and in particular to apparatus for detecting and monitoring losses and/or faults in optical fibres. The invention also provides a device for inserting light into or receiving light from an optical path or one of a series of optical paths.

BACKGROUND OF THE INVENTION

It is well known that faults in optical fibres can be located by an optical time domain reflectometer (OTDR). An OTDR launches a pulse of light into an optical fibre, and backscattered light is monitored for abrupt changes indicative of a loss or fault. The distance of the loss or fault from the launch end of the fibre can be determined from the time interval between launch and return of the backscattered peak. Once a period of time sufficient to receive all detectable backscattered light has passed, a further pulse may be launched into the fibre. The pulse width may be varied for different dynamic range or resolution requirements. Thus, for a given amplitude, an increase in the pulse width enables a greater length of fibre to be monitored, that is to say it increases the dynamic range of the OTDR. The dynamic range of an OTDR is the loss after which an event, backscatter or reflection can still be detected.

The OTDR is an extremely useful form of optical test equipment since, from connection to a single end of an optical fibre network, the location of losses and reflections can be determined, and their amplitude measured, to a high degree of accuracy. For loss measurements, both point-losses and end-to-end fibre or network losses can be measured. In duplex networks, the amplitude of any reflections is important, since these may cause crosstalk. In some known schemes it is possible using wavelength division multiplexing (WDM) techniques, to take these measurements at a particular wavelength i.e. 1650 nm whilst the network is carrying data at another wavelength i.e. 1550. However, one drawback in using WDM techniques is the required use of relatively expensive WDM couplers. On the other hand, inexpensive couplers tend to have an associated signal loss that is not acceptable for many OTDR applications.

It is an object of this invention to provide an OTDR that will obviate the use of WDM couplers.

It is a further object of the invention to provide an inexpensive device for testing an optical waveguide in the absence of traffic.

More generally, it is also an object of the invention to provide a device and method for inserting light signals into, or receiving light signals from, an optical path while temporarily interrupting a normal flow of signals in the path, and to provide a method for performing this same function.

SUMMARY OF THE INVENTION

In accordance with one aspect of the invention, there is provided a device for inserting light signals into an optical waveguide or receiving light signals from a waveguide which forms part of an optical path, comprising: a first lens disposed at a first location; a second lens connectable to said waveguide and disposed at a second location such that inwardly facing end faces of said lenses define a gap, the first and second lenses being optically aligned such that a beam of light coupled to one of the first and second lenses crosses the gap and is transmitted at the other of the lenses, and such that said first and second lenses and the gap form part of said optical path. The device further comprises means for directing a light signal into the gap and into the inwardly facing end face of said second lens, and/or for receiving a light signal from the waveguide via the inwardly facing end face of the second lens.

Further in accordance with the invention, there is further provided a device for testing an optical path, comprising: first and second collimating lenses disposed back-to-back and having a gap between inwardly facing collimating end faces; an optical element movable into and out of the gap for providing an optical signal to one of the lenses when positioned within the gap for testing an optical path beginning at said one lens, the arrangement being such that when said optical element is moved out of the gap signals may be transmitted from one of the lenses to the other, across the gap.

In accordance with yet another aspect of the invention, a device for inserting light signals into, or receiving light signals from, a selected one of a series of optical paths, comprises a first array of first lenses spaced apart from each other and each connectable to a first waveguide, and a second array of second lenses spaced apart from each other and each connectable to a second waveguide, each first lens being optically aligned with a corresponding second lens so that each pair of corresponding lenses and waveguides connected thereto can constitute one of the optical paths, the lenses of each pair being separated by a gap. The device further comprises a movable optical element optically connected to a monitor waveguide, and means for moving said optical element between an operative position, in which the optical element is within a selected one of said gaps and in which a light signal can be transmitted between the monitor waveguide and the second lens via the optical element, and an inoperative position in which a light signal can pass without interference between the lenses of a pair.

In a preferred embodiment, the first array of lenses are spaced apart about a first circle, the second array of lenses are spaced apart around a second circle, the first and second circles being adjacent each other and having the same axis and similar diameter, and the means for moving the optical element includes a rotary member rotatable about said axis, means for rotatably positioning the rotary member, and a carrier movably mounting the movable optical element on the rotary member. Means are provided for moving the carrier inwardly and outwardly relative to the rotary member between an operative position, in which the movable optical element is at a suitable radius from the axis to be locatable within a selected one of the gaps where a light signal can be transmitted between the monitor waveguide and the second lens via the movable optical element, and an inoperative position in which the rotary member can be rotated without interference occurring between the movable optical element and light signals crossing said gaps.

BRIEF DESCRIPTION OF THE DRAWINGS

Exemplary embodiments of the invention will now be described in conjunction with the drawings, in which:

FIG. 1a is a diagrammatic representation of the OTDR switch in accordance with the invention in a normal signal transmitting position;

FIG. 1b is a side view of a the same device illustrating the operation of the switch in a position for transmitting test pulses along an optical fiber;

DETAILED DESCRIPTION

Figure 2:
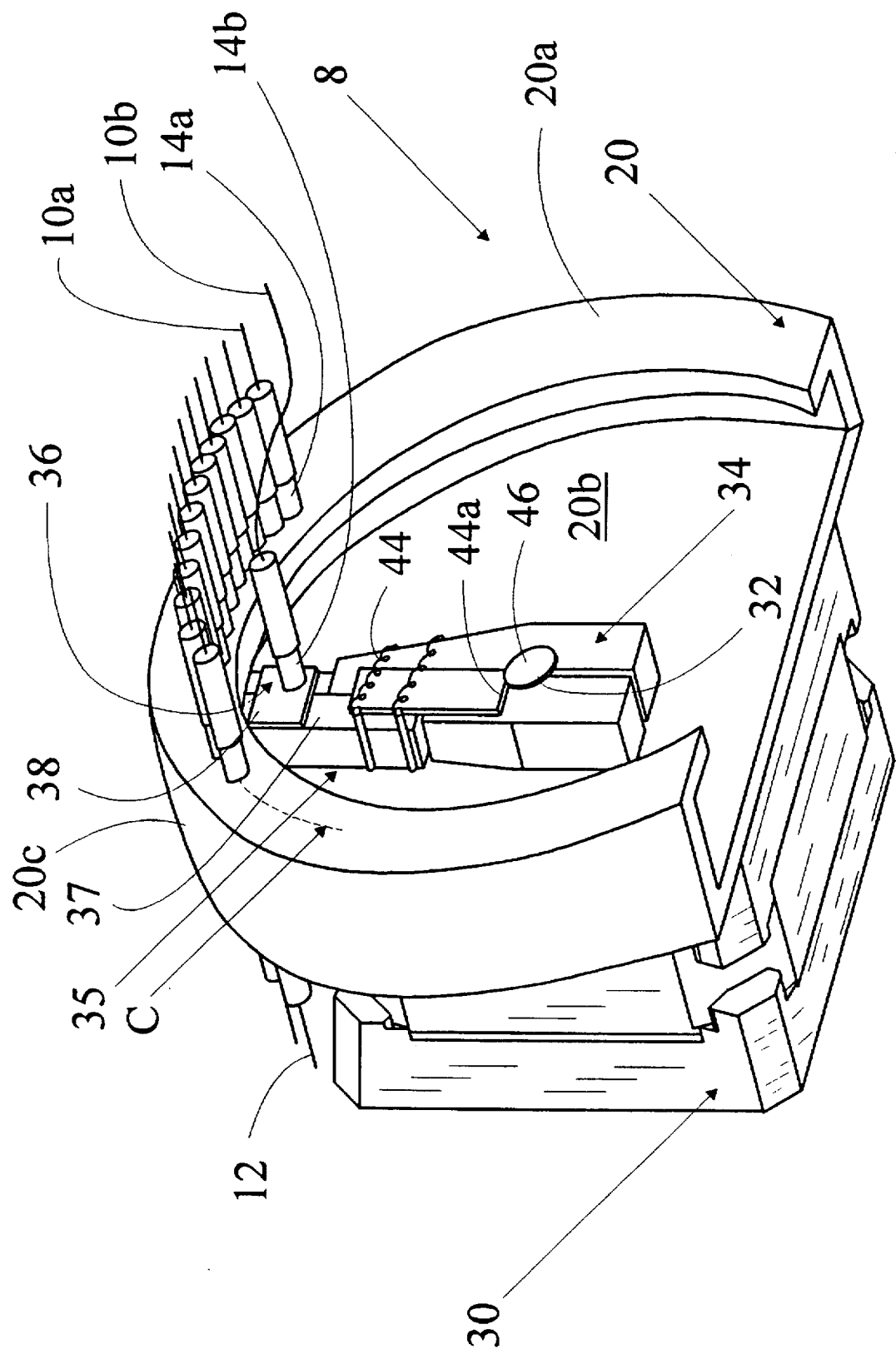
FIG. 2 is a perspective rear view of one form of the switch in accordance with the invention.

Referring now to FIG. 1a, an opto-mechanical OTDR switch 8 is shown in a first mode of operation having in input optical fiber 10a optically aligned with an output optical fiber 12. A collimating graded index (GRIN) lens 14a is coupled to the input fiber 10a and an identical collimating GRIN lens 18 is coupled to the output optical fiber 12. The lenses 14a and 18 are optically aligned in such as manner as to allow light exiting the optical fiber 10a and the lens 14a to be coupled into the GRIN lens 18 and the optical fiber 12, via the gap 11 between the lenses. Although the lenses are optically aligned the optical axes of the GRIN lenses 14a and 18 are preferably offset to lessen the effects of unwanted back reflections between the lenses. Alternatively the end-faces of the lenses could be angled to lessen the effects of back reflections. Close to and in parallel to lens 14a is a similar lens 14b connected to a monitor fiber 10b. In FIG. 1a a selectably-movable prism 16 is shown in a selected, unused, position, disposed well below the gap 11 between the lenses 14a and 18. When the prism is out of the gap 11 it does not interfere with normal signal transmission along the optical path which includes the gap 11 and optical fibers 10a and 12.

Turning now to FIG. 1b, the switch 8 is shown in a second mode of operation whereby the selectably-movable prism 16 is disposed in an in-use test position that optically aligns the optical fiber 10b with the output optical fiber 12 under test. Of course, the normal signal transmission between the input optical fiber 10a and the output fiber 12 is temporarily interrupted while in this second test mode of operation. The prism 16 serves as a means for providing a test light into the inwardly facing end-face of the lens 18 and to the optical fiber 12 under test when a collimated pulse of light is directed into the prism disposed within the gap 11. The prism 16 also provides a means for receiving reflected light from the optical fiber 12 by receiving the reflected light from the inwardly facing end-face of the lens 18 within the gap. In essence, the prism provides a function similar to that of a periscope; however, in the form of a prism 16, it conveniently comprises a single light guiding element.

In the embodiment shown in FIGS. 1a and 1b, the means for providing light pulses at predetermined intervals and for receiving and analyzing reflected pulses is an ODTR 9 shown coupled to the switch 8. Of course, such OTDRs are well known by those skilled in the art. However, this invention is primarily concerned with a means for providing an OTDR signal to an optical waveguide, which is part of an optical path, and for receiving a reflected signal for analysis. It will be understood that use of an ODTR is not essential, and that the switch of this invention may be used in other circumstances where it is desired to insert a light signal into, or receive a light signal from, a waveguide which is part of an optical path.

Specific forms of the invention will now be described in conjunction with FIGS. 2 to 12 showing preferred embodiments of the switch 8.

Figures 3, 4, 5:
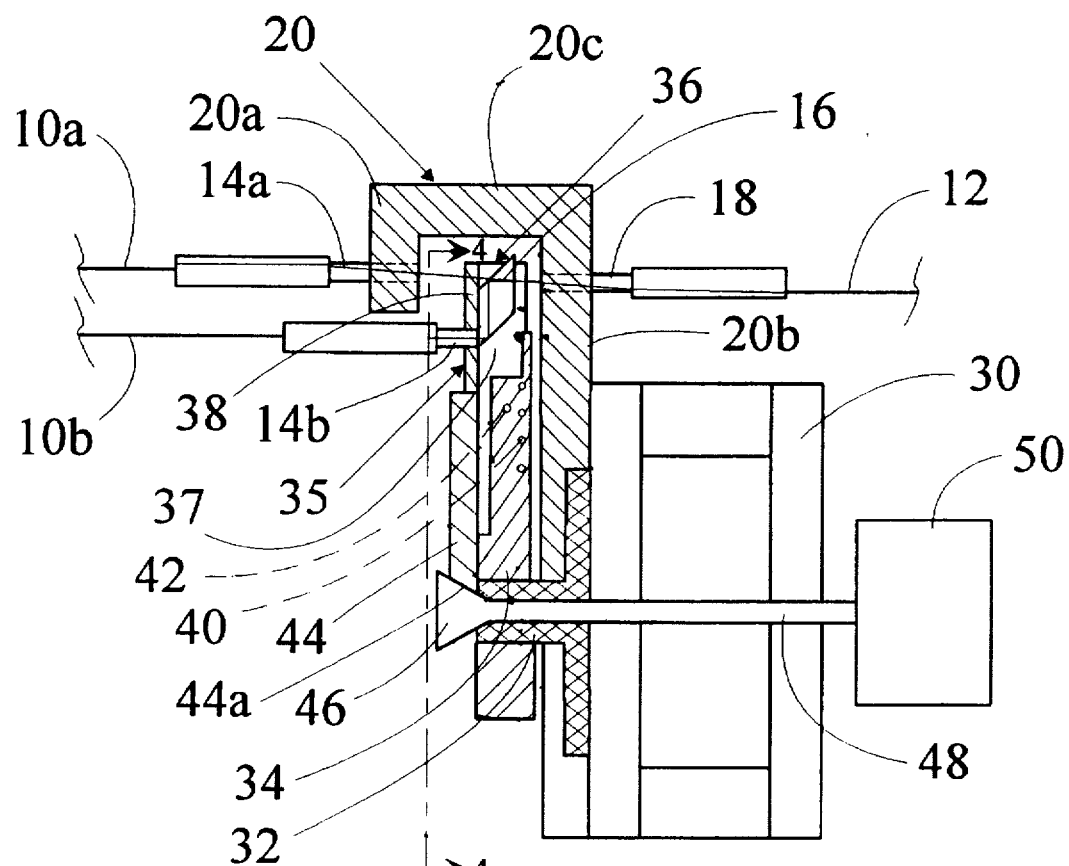
FIG. 3 is a sectional elevation of the device shown in FIG. 2.
FIG. 4 is a fragmentary rear end view of parts of the same switch as shown in FIGS. 2 and 3, taken along lines 4—4 of FIG. 3.
FIG. 5 is a view similar to FIG. 4 showing a first variation of the switch.

As shown in FIGS. 2 and 3, the switch has an array of first, normally input, lenses 14a, each connected at a rear end to an input fiber 10a, the lenses having their front ends received in parallel, equally spaced apertures arranged along the circumference of a first circle C in a rear flange 20a of a mounting ring 20. This ring is integral with an outer cylindrical web 20c connecting the flange 20a to a front plate 20b, which plate has similar equally spaced apertures arranged along the circumference of a second circle, each of which apertures holds a second lens, normally an output lens 18, connected to output fiber 12. The second circle has the same axis as the first circle C, and is of similar but slightly smaller diameter to allow a slight off-set between the lenses of each pair of optically aligned input and output lenses. The lenses have a gap between their facing ends corresponding to the internal dimension of web 20c. Although FIG. 2 only shows a few lenses, it will be apparent that these arrays of lenses could occupy most of a circle, or all of a circle if ring 20 were to be fully circular.

On the front face of plate 20b is mounted a stepper motor 30 having an output shaft 32 which projects rearwardly through an aperture in the plate, centrally of the part-circular arrays of lenses, and the rear end of this shaft has fixed to it a rotary arm 34. As seen in FIGS. 2 and 4, one side of the outer end of this arm has a cut-away portion which receives a carrier 35 for a movable optical element indicated generally at 36. This carrier includes an elongated, radially extending block 37, the rear surface of which carries a support plate 38 having an aperture holding the front end of the movable lens 14b, and having its front surface fixed to the rear surface of the prism 16. The carrier 35 is mounted for radial movement relative to arm 34 by anti-friction bearings including a row of small ball bearings 40, best seen in FIG. 4, which move in shallow V-grooves in the inner side face of block 37 and in an opposed radial side face of arm 34, and further including a stabilizing ball bearing 42 retained in a pocket in the inner side face of block 37. The ball bearings 40 are held at suitable spacing by an apertured sheet metal spacer or cage 41 seen in FIG. 4. The surfaces separated by the bearings are urged together by tension springs 42 which connect the block 37 to the arm 34, and which are angled so that their tension has a component which urges the carrier radially inwardly towards the shaft 32.

To the rear surface of the carrier block 37 is fixed a push member 44 which extends towards the axis of the arm 34, and which terminates in a sloping end surface 44a, arranged to mate with a wedging surface on the inner side of the enlarged conical end 46 of a pull rod 48. This pull rod is slidable within a bore in the stepper motor shaft 32, and a front end of this rod projects from the front of the stepper motor and is connected to a solenoid actuator 50. With this arrangement, when the solenoid 50 is energized, the pull rod 48 is drawn forward into shaft 32, causing the member 44 to move radially outwards. This moves the carrier 35 into the position shown in FIG. 3 where the prism 16 is inserted into the gap between a pair of lenses 14*a* and 18, interrupting the light signal passing between these lenses, and allowing light signals to pass between lenses 14*b* and 18, for testing purposes as described above. When the solenoid 50 is de-energized, the pull rod 48 is free to slide rearwards while springs 42 pull the carrier 35 radially inwardly. In this inner, inoperative, position of the carrier the arm 34 can be rotated without interference between the movable optical element 36 and light signals crossing the gaps between lenses 14*a* and 18.

FIG. 5 is a view similar to FIG. 4 and shows a switch similar to that shown in FIGS. 2 to 4, in which corresponding parts have the same reference numerals. This switch has two changes relating to the rotary arm 34' and associated parts. Firstly, instead of having a carrier block mounted on anti-fiction bearings, the carrier 35' for the movable optical element has a block 37' which is mounted on readily flexible metal webs 40'. These allow suitable radial movement of the block, and also bias this towards the axis of the arm 34'. Secondly, a solenoid 50' is, in this case, mounted directly on the arm 34', and its actuator 52' is directly connected to the block 37'.

Figure 6:
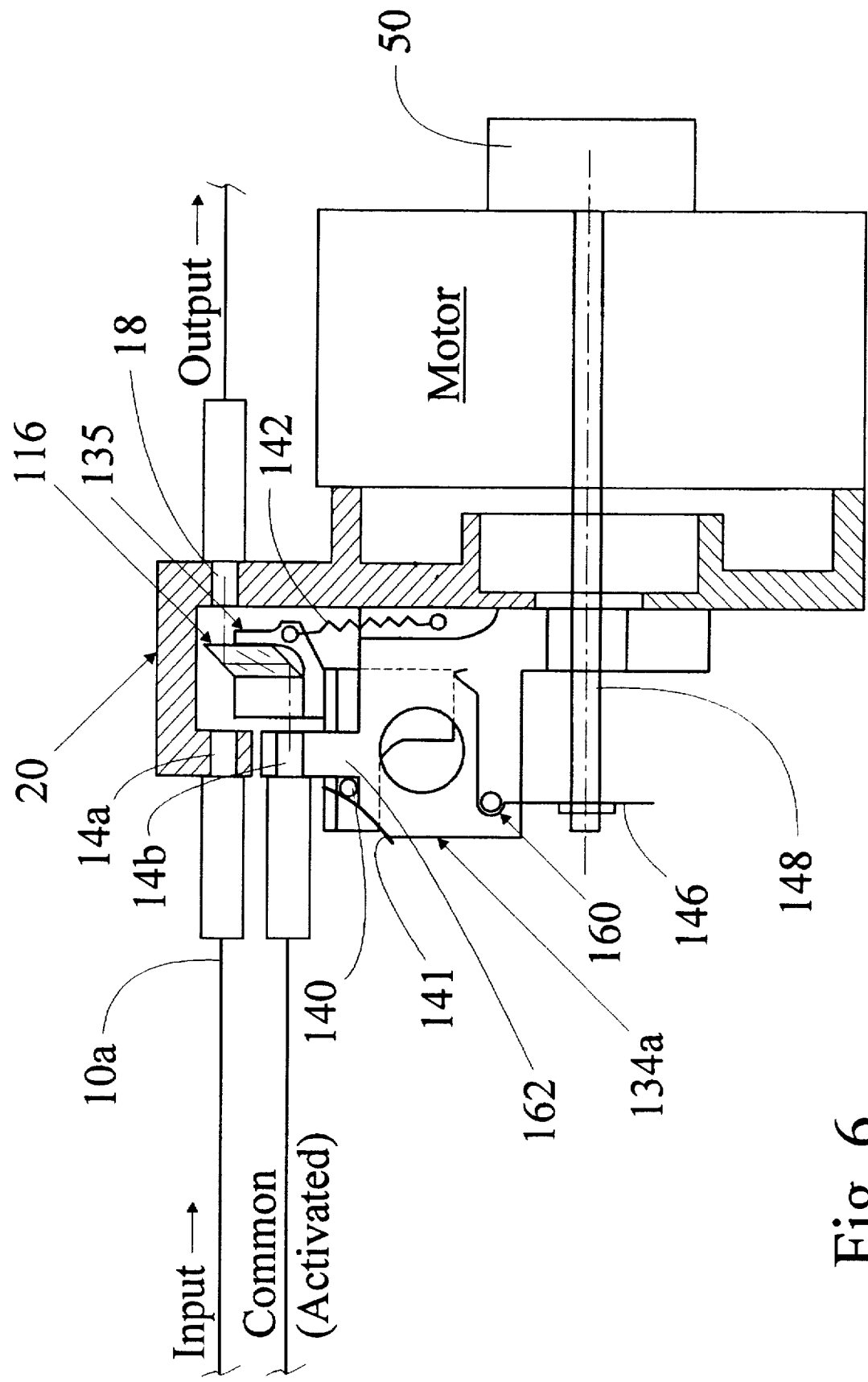
FIG. 6 is a view similar to FIG. 3 of a second variation of the switch.
Figure 7:
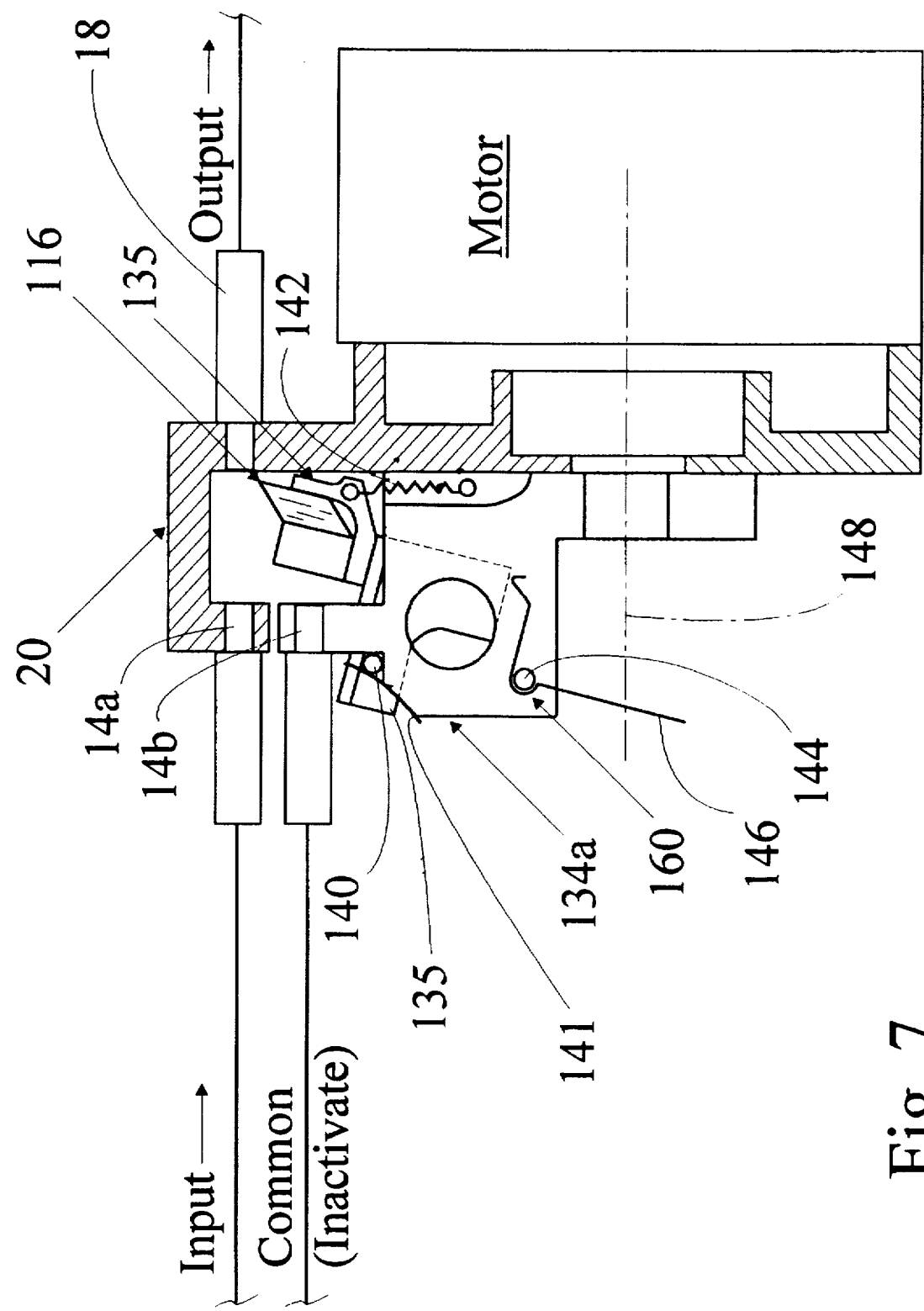
FIG. 7 is a view similar to FIG. 6 of the second variation of switch in a second position.
Figure 8:
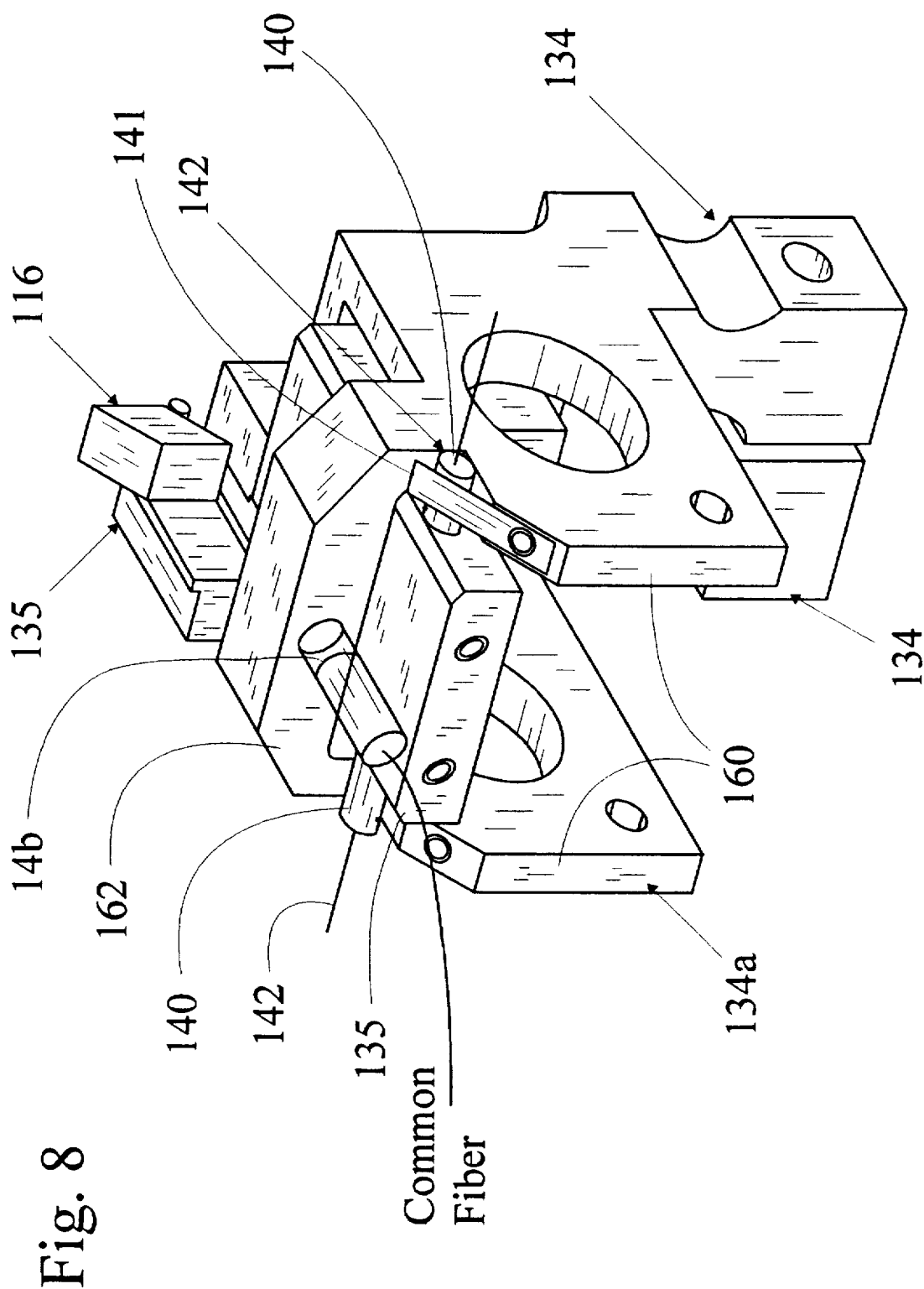
FIG. 8 is a perspective view of a component of the second variation of switch.
Figure 9:
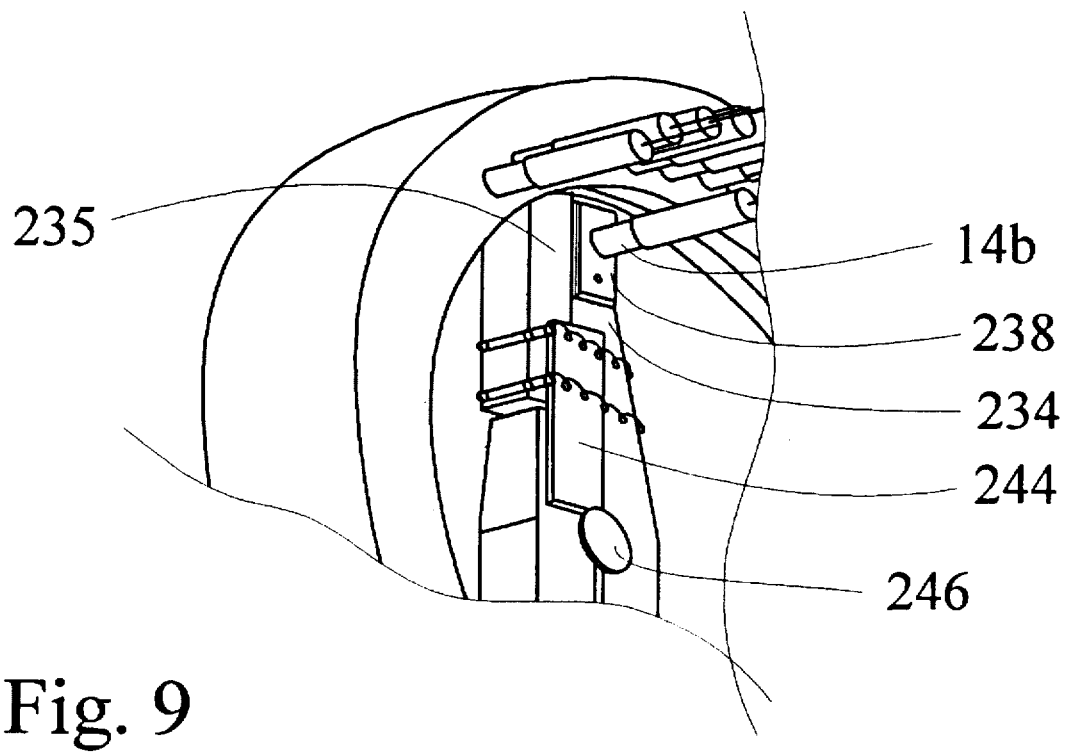
FIG. 9 is a fragmentary portion of a view similar to FIG. 2 but showing a third variation.

FIGS. 6 and 7 are views similar to FIG. 3 of an alternative arrangement, in which the prism 16 is mounted for radial and circumferential movement, as in the embodiment of FIGS. 2 and 3, but in which the lens 14*b* is mounted for circumferential movement only. Another difference is that the radial movement of the prism is achieved by a design of carrier 135 which is pivotally mounted on the rotary member 134, the pivot axis, indicated at 142 in FIG. 8, being transverse to, and displaced from, the axis of the rotary member.

As shown, the rotary member 134 has a U-shaped part 134*a* the arms 160 of which extend rearwardly, with the radially outer edges of the arms being connected by a bridge 162, all of these parts of the rotary member being integrally formed. The center of this bridge 162 has a bore, parallel to the axis of stepper motor 30, which holds the lens 14*b*, which accordingly rotates with the rotary member but does not move radially. At the rear of the junctions between the bridge 162 and the arms 160 are reentrant corners which receive pivot pins 140 extending co-axially from the ends of the carrier 135. These pivot pins are retained in place by clamping strips 141 secured to the arms adjacent to the corners; these strips constitute spring means urging the pivot pins into the corners and precluding and play at the pivots. The front of carrier 135 projects beyond the front side of bridge 162, where it holds the prism 116 at a location well spaced from the pivot pins. A tensile spring 142 extends between the portion of the carrier 135 adjacent the prism, and urges the carrier into the retracted position shown in FIG. 7, in which the rotary member is free to rotate without the prism interrupting a light beam passing between the lenses 14*a* and 18. A shaft 144 connects the two arms 160 at their rear inner corners, and this shaft mounts an arm 146 the inner end of which is movable along the axis of the rotary member by axial shaft 148 connected to solenoid 50. Thus, actuation of the solenoid pivots the carrier 135 against the spring 142 and moves the prism 116 to the operative position shown in FIG. 6 where it interrupts light passing between the lenses 14*a* and 18 and allows light signals to pass, via lens 14*b* and the prism 116, to or from the lens 18. In this embodiment, the means for mounting the carrier ensure minimal play, and accurate positioning of the prism.

FIGS. 9 to 12 show a further embodiment which is similar to that of FIGS. 2 to 4, but different in that:

1) The lens 14*b* rotates with the rotary member, but does not move radially; and 2) The prism and carrier are modified so that the prism can not only direct light from lens 14*b* into lens 18, but can also move to a third position in which it directs light from lens 14*b* into lens 14*a*.

Figure 11:
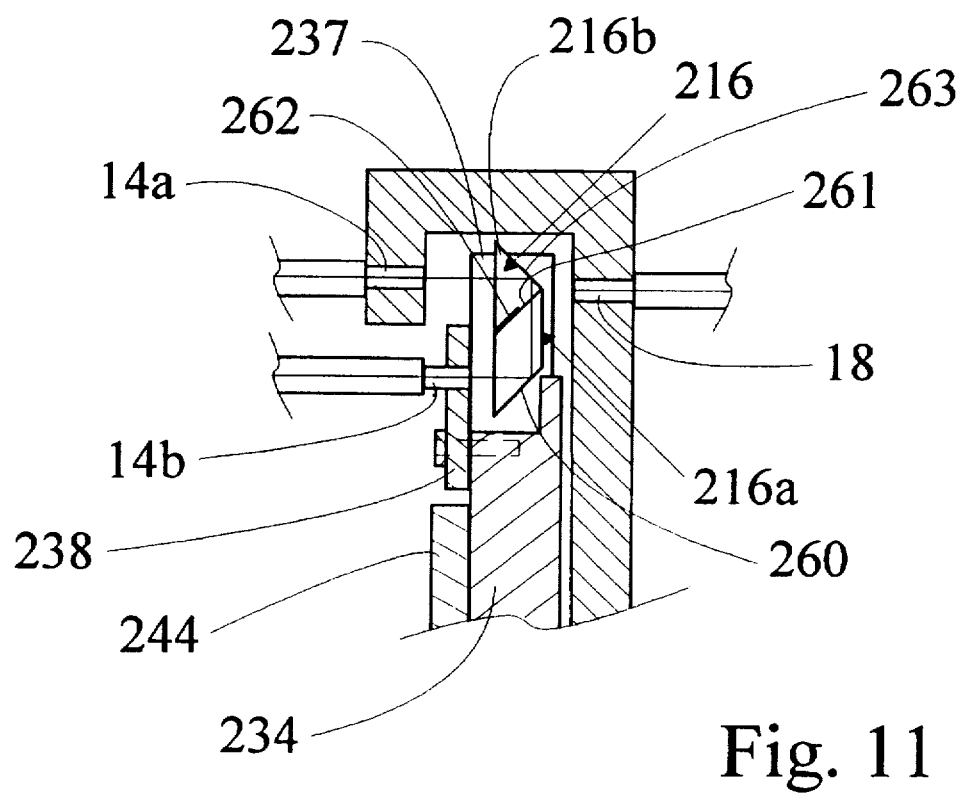
FIGS. 11 and 12 are views similar to FIG. 10 but on an enlarged scale, showing two different operative positions of the prism.
Figure 12:
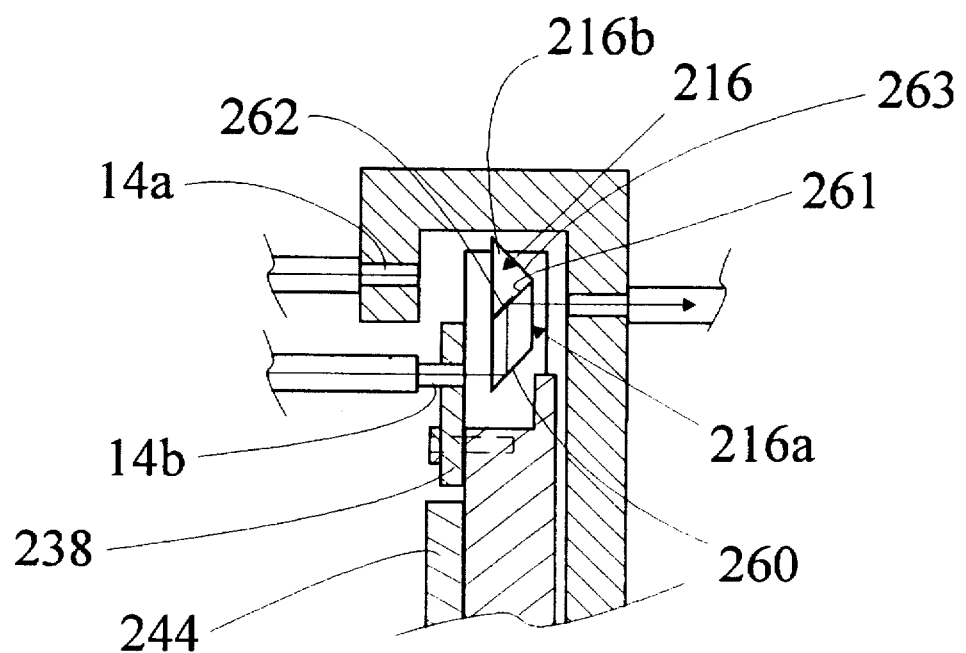

In this embodiment, while the prism 216 is mounted on radially movable carrier block 237, similar to the carrier block 37, the lens 14*b* is mounted directly on the rotary member 234 by plate 238. Otherwise the construction, as it relates to the carder block 237 and its anti-friction mounting, is similar to the embodiment of FIGS. 2 to 4, and the push bar 244 co-acts with conical end 246 of pull rod 248 in similar manner. However, in this embodiment, instead of a simple two-position solenoid 50 being used, an indexing motor (not shown) giving three positions of the pull rod 248 is used. Also, as shown in FIGS. 11 and 12, a compound prism 216 is used, having a first portion 216*a* with inner and outer parallel surfaces 260 and 261, both at 45° to the radial sides, and a second portion 216*b* which is triangular and has an inner surface in contact with surface 261, and an outer surface 263 at 90° to surface 261. The radially inner half of surface 261 is silvered, at 262, while the outer half is joined to the inner surface of part 216*b* by index-matching cement so that light can easily pass through this part of the junction of the two pans.

Figure 10:
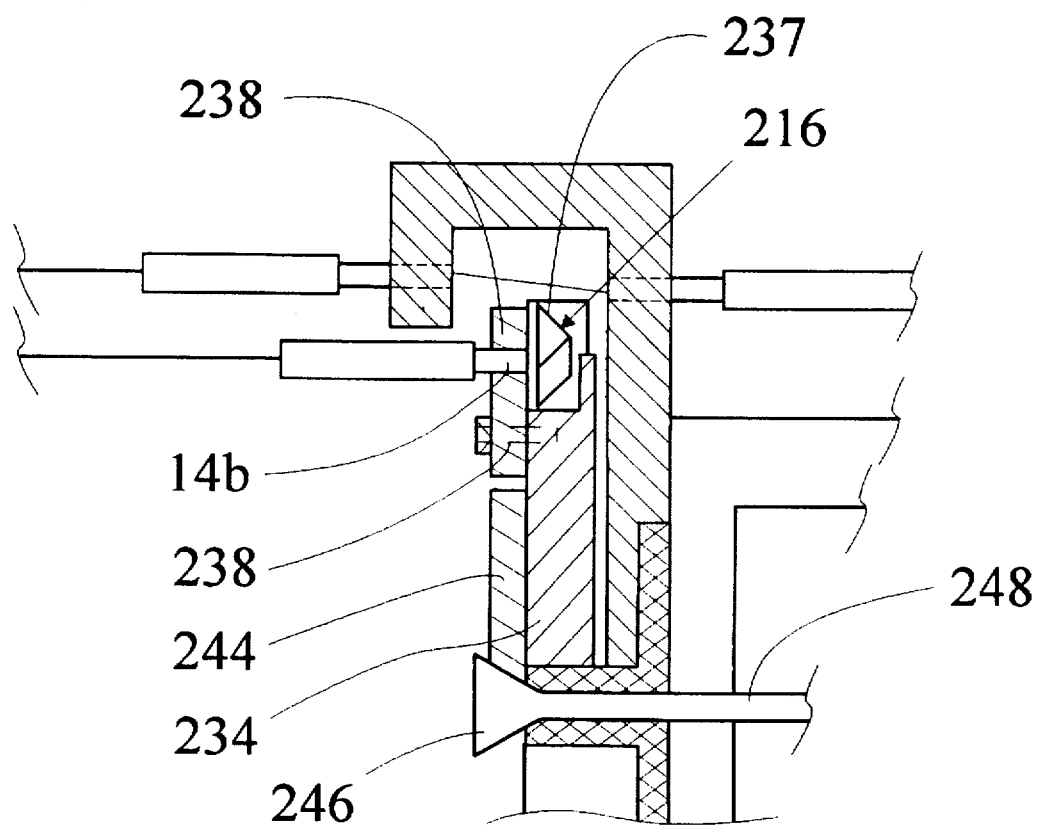
FIG. 10 is a fragmentary portion of a view similar to FIG. 3 showing the third variation.

As in the previous embodiments, in a first, inoperative position of the carrier, the prism 216 is at a radially innermost position, indicated in FIG. 10, in which the rotary member can be rotated without the prism interrupting light passing between lenses 14*a* and 18. In an outermost position, shown in FIG. 12, the prism part 216*a* operates, again as in the earlier embodiments, to direct light from lens 14*b* to lens 18, or vice versa, the prism position being arranged so that light passing radially through the prism is reflected from the silvered portion 262 of the junction of the two prism parts. This embodiment provides an intermediate position, shown in FIG. 11, in which light received from lens 14*b* and reflected off surface 260 of the prism passes through the outer part 261 of the junction between the two prism parts, and is reflected from surface 263 back into lens 14*a*. Accordingly, with this arrangement, light signals can be passed from lens 14*b* selectively into either lens 14*a* or 18.

Of course, numerous other embodiments may be envisaged without departing from the spirit and scope of the invention.

What we claim is:

1. A device for inserting light signals into, or receiving light signals from, a selected one of a series of optical paths, comprising:

a series of pairs of first and second lenses each pair connected to a corresponding pair of first and second waveguides, the lenses of each pair being optically aligned so that normally a light signal can pass through a lens pair between the first and second waveguides and so that each pair of aligned lenses and the corresponding waveguides can constitute one of said optical paths, the lenses of each pair being separated by a gap, said first lenses being spaced apart along the circumference of a first circle, and the second lenses being spaced apart along the circumference of a second circle which is adjacent to the first circle and has the same axis, a movable optical element optically connected to a monitor waveguide; and means for moving said movable optical element between an operative position, in which the optical element is within a selected one of said gaps and in which a light signal can be transmitted between the monitor waveguide and the second lens via the optical element, and an inoperative position in which a light signal can pass without interference between the lenses of a pair;

wherein said means for moving said optical element comprises a rotary member carrying said movable optical element and rotatable about said axis, and wherein means are provided for rotating said rotary member for precisely aligning the movable optical element with one of said gaps.

2. A device as defined in claim 1, wherein the movable optical element comprises a prism.

3. A device as defined in claim 2, wherein the prism is such as to receive light along a first path and to emit the light along a path parallel to the first path.

4. A device as defined in claim 1, wherein said movable optical element includes a prism connected to and movable with a collimating lens, said last-mentioned lens being connectable to said monitor waveguide.

5. A device for inserting light signals into, or receiving light signals from, a selected one of a series of optical paths, comprising:

a first array of first lenses parallel to each other and spaced apart from each other along the circumference of a first circle and each connectable to one of a series of first waveguides;

a second array of second lenses parallel to each other and spaced apart from each other along the circumference of a second circle and each connectable to one of a series of second waveguides, said first and second circles being adjacent each other and having the same axis and each first lens being optically aligned with a corresponding second lens so that each pair of corresponding lenses and waveguides connected thereto can constitute one of said optical paths, the lenses of each pair being separated by a gap;

a movable optical element optically connectable to a monitor waveguide;

a rotary member rotatable about said axis and means for rotatably positioning said rotary member;

a carrier movably mounting the movable optical element on the rotary member, and means for moving the carrier inwardly and outwardly relative to the rotary member between an operative position, in which the movable optical element is at a suitable radius from said axis to be locatable within a selected one of the gaps by said rotatable positioning means at a position where a light signal can be transmitted between the monitor waveguide and the second lens via the movable optical element, and an inoperative position in which the rotary member can be rotated without interference between the movable optical element and light signals crossing said gaps.

6. A device as claimed in claim 5, wherein said movable optical element is a prism connected to, and movable with, a collimating lens connectable to said monitor waveguide.

7. A device as defined in claim 5, wherein said carrier is movable radially of the rotary member on antifriction bearing means.

8. A device as defined in claim 5, wherein said carrier is connected to said rotary member by flexible elements which allow movement between said operative and inoperative positions.

9. A device as defined in claim 5, wherein a solenoid operated actuator connects the carrier to the rotary member.

10. A device as defined in claim 5, further comprising a solenoid operated actuator connected to a rod extending axially of the rotary member, and wedge means interconnecting said rod and said carrier for moving the carrier radially when the rod is moved axially by the solenoid.

11. A device as claimed in claim 5, wherein said movable optical element is a prism separate from and optically coupled to a collimating lens connected to said monitor waveguide, said last mentioned lens being mounted at a fixed radius.

12. A device as defined in claim 5, wherein the movable optical element includes a prism means capable of directing a signal in opposite directions depending the position of the prism.

13. A device as defined in claim 12, wherein the means for directing a light signal is capable of providing an optical signal to said first lens when positioned at a first position within said gap, and is capable of providing an optical signal to said second lens when positioned at a second position within said gap.

* * * * *